United States Patent
Ejakov

(10) Patent No.: US 10,598,225 B2
(45) Date of Patent: Mar. 24, 2020

(54) ENGINE BLOCK WITH RECESSED MAIN BEARING CAP

(71) Applicant: Ford Global Technologies, LLC, Dearborn, MI (US)

(72) Inventor: Mikhail Ejakov, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 607 days.

(21) Appl. No.: 14/978,365

(22) Filed: Dec. 22, 2015

(65) Prior Publication Data

US 2017/0175817 A1   Jun. 22, 2017

(51) Int. Cl.
| | |
|---|---|
| *F02B 75/22* | (2006.01) |
| *F16C 35/02* | (2006.01) |
| *F02F 7/00* | (2006.01) |
| *F16C 9/02* | (2006.01) |

(52) U.S. Cl.
CPC .......... *F16C 35/02* (2013.01); *F02F 7/0053* (2013.01); *F02F 7/0095* (2013.01); *F16C 9/02* (2013.01); *F16C 2240/40* (2013.01); *F16C 2360/22* (2013.01)

(58) Field of Classification Search
CPC .......... F16C 9/02; F16C 35/00; F02F 7/0053
USPC .................................................. 123/195 R
See application file for complete search history.

(56) References Cited

U.S. PATENT DOCUMENTS

| | | | | |
|---|---|---|---|---|
| 1,283,803 A | * | 11/1918 | Kirkham | F16C 9/02 384/432 |
| 4,037,888 A | * | 7/1977 | Mirjanic | F16C 35/00 384/434 |
| 4,693,216 A | * | 9/1987 | Ampferer | F02F 7/0053 123/195 C |
| 4,705,092 A | * | 11/1987 | Ito | B22C 9/046 164/112 |
| 6,189,492 B1 | | 2/2001 | Brown | |
| 6,308,680 B1 | * | 10/2001 | Prior | F02F 7/0012 123/195 H |
| 6,926,444 B2 | * | 8/2005 | Rengmyr | F16C 9/02 29/898.12 |
| 2004/0264822 A1 | * | 12/2004 | Binder | F02F 7/0053 384/429 |

(Continued)

FOREIGN PATENT DOCUMENTS

| | | |
|---|---|---|
| CA | 2306694 A1 | 10/2000 |
| CH | 565327 A5 | 8/1975 |

*Primary Examiner* — Long T Tran
*Assistant Examiner* — James J Kim
(74) *Attorney, Agent, or Firm* — Geoffrey Brumbaugh; McCoy Russell LLP

(57) ABSTRACT

Systems are provided for an engine block assembly comprising a cylinder block, bearing caps and crankshaft main bearings. In one example, an engine block assembly may comprise a cylinder block, a bearing cap bolted to the cylinder block, the bearing cap comprising: a first recess included in a first surface, a second recess included in a second surface opposite the first surface, and a thrust surface interfacing with a crankshaft bearing, where a rigidity of the thrust surface may vary along an axial profile of the thrust surface due to the first and second recesses. When the bearings caps are bolted to the cylinder block, the thrust surface may bend due to its variable rigidity, and as such may induce a bend in an axial profile of the crankshaft bearing to a more convex shape.

20 Claims, 8 Drawing Sheets

(56) References Cited

U.S. PATENT DOCUMENTS

2013/0170774 A1\* 7/2013 Mochida .................. F16C 9/02
384/91

\* cited by examiner

ENGINE BLOCK WITH RECESSED MAIN BEARING CAP

FIELD

The present description relates generally to an engine block assembly for a multi-cylinder combustion engine.

BACKGROUND/SUMMARY

In engine block assemblies, a crankshaft converts translational motion of one or more pistons into rotational motion for propelling an on-road vehicle. The crankshaft is retained and supported between thrust surfaces of a cylinder block comprising combustion chambers and main bearing caps. Specifically, the main bearing caps may be bolted to the cylinder block to retain and support the crankshaft. Bearings may be positioned between the thrust surfaces and the crankshaft, and may be lubricated to enable rotation of the crankshaft. Main journals of the crankshaft may directly interface with the bearings. Engine performance and long-term degradation may be affected by circumferential and/or axial profiles of the crankshaft and main bearings. To increase engine performance, and reduce long-term degradation of engine components, one or more of the crankshaft and bearings may be machined to attain a desired axial profile.

However, the inventors herein have recognized potential issues with such systems. Specifically, machining of the crankshaft and/or bearings may be time consuming, expensive, and may be subject to very low error tolerances. Further, machining of the crankshaft and/or bearings may be inconsistent.

As one example, the issues described above may be addressed by an engine block assembly comprising a cylinder block, and a bearing cap bolted to the cylinder block, the bearing cap comprising, a first recess included in a first surface, a second recess included in a second surface opposite the first surface, and a thrust surface interfacing with a crankshaft bearing, where a rigidity of the thrust surface varies along an axial profile of the thrust surface due to the first and second recesses.

The rigidity of the thrust surface may be greater more proximate a central axis of the bearing cap than at edges of the thrust surface. As such, the thrust surface may bend to a more convex axial profile when bolting the bearing cap to the cylinder block. Further, when bolting the bearing cap to the cylinder block, the thrust surface may exert a compressive force on the crankshaft bearing. However, due to the bending of the thrust surface, the compressive force may vary along an axial profile of the bearing, where the compressive force may greater nearer a central axis of the crankshaft bearing. Thus, the bearing may bend such that a convexity of the axial profile of the bearing is increased. As such, machining of the crankshaft and/or bearing may be reduced, and therefore the cost of the engine block assembly may be reduced. Further, the time to produce the engine block assembly may be reduced.

In another example, a crankshaft main bearing cap may comprise a first recess included on a front surface of the bearing cap, a second recess included on a back surface, opposite the front surface, a semicircular thrust surface for retaining a crankshaft, where a flexibility of the thrust surface may vary along an axial profile of the thrust surface, and a thrust bearing adapted to interface with the thrust surface and a main journal of the crankshaft.

In yet another example, an engine block assembly may comprise a cylinder block, a crankshaft, a bearing cap bolted to the cylinder block, the bearing cap comprising a first recess extending inwards from a front first surface of the bearing cap, a second recess extending inwards from a second surface opposite the first surface, and a thrust surface, where a mechanical strength of the thrust surface may be greater nearer a central axis of the thrust surface, and a crankshaft bearing positioned between the crankshaft and the bearing cap, and where a first surface of the bearing may interface with the thrust surface, and where an opposite second surface of the bearing may interface with a main journal of the crankshaft.

In this way, the cost, and time to produce an engine cylinder block assembly may be reduced. Further the consistency of a shape of a main bearing of the engine cylinder block may be increased. By including recesses on main bearing caps of the cylinder block assembly, the compressive force exerted on the bearing caps when the bearing caps are bolted to the cylinder block may vary along an axial profile of the bearings. As such, an axial profile of the bearings may be achieved when bolting the bearing caps to the cylinder block, and therefore expensive and time consuming machining of the bearings and/or crankshaft may be reduced and/or eliminated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-7 are drawn approximately to scale. However, it should be appreciated that other relative dimensions may be used. Further, the drawings may depict components directly or indirectly touching one another and in contact with one another and/or adjacent to one another, although such positional relationships may be modified, if desired. Further, the drawings may show components spaced away from one another without intervening components there-between, although such relationships again could be modified, if desired.

DETAILED DESCRIPTION

Figure 1:
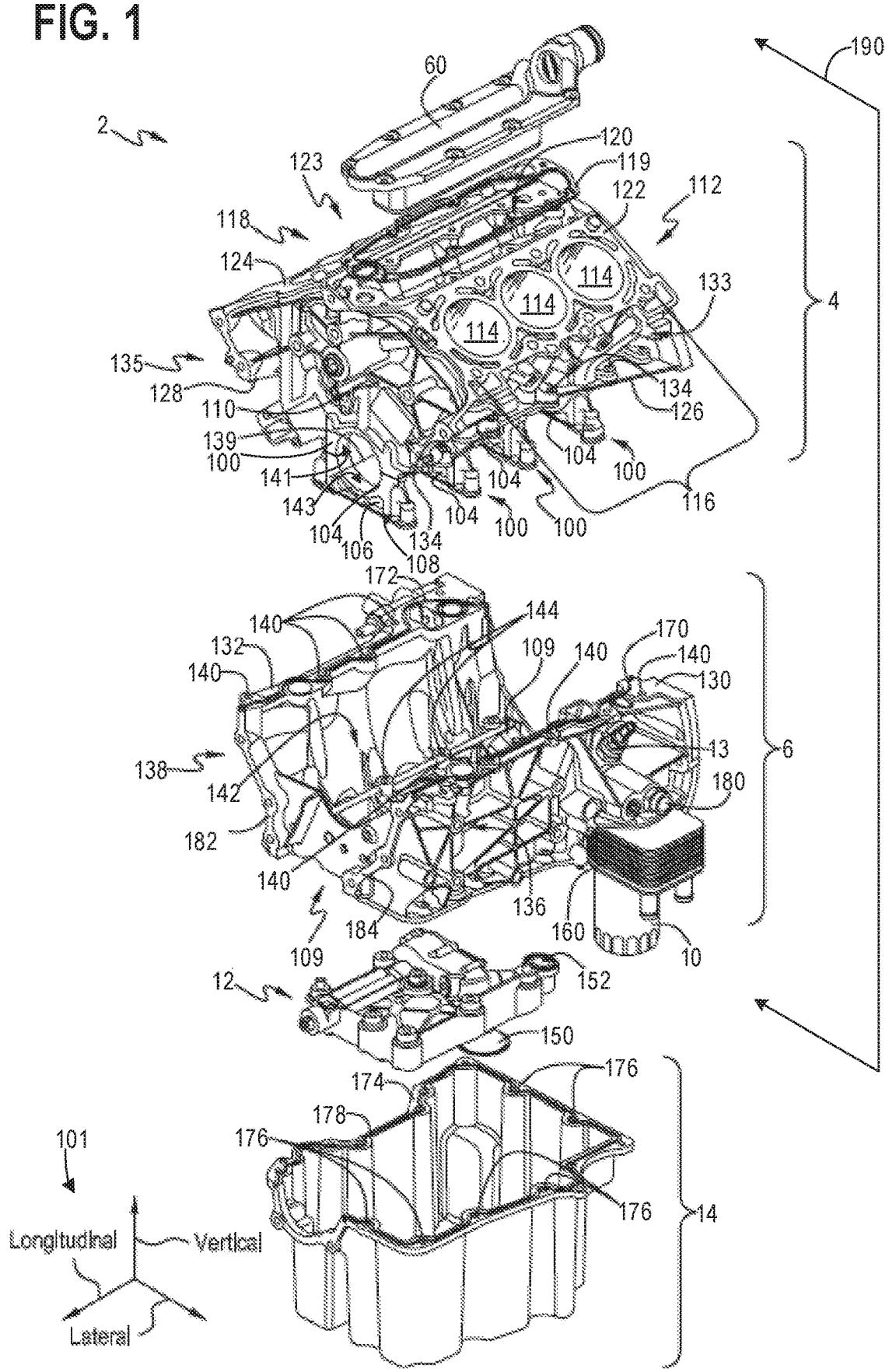
FIG. 1 shows an exploded side perspective view of an example cylinder block assembly including a main bearing and main bearing cap.

The following description relates to systems and methods for assembling an engine cylinder block assembly. As shown in the example of FIGS. 1-2B, a cylinder block assembly may include a cylinder block with a plurality of combustion chambers, main bearing caps for retaining a crankshaft, and bearings for enabling rotation of the crankshaft relative to the cylinder block and main bearing caps. To increase long-term engine performance and reduce degradation of the cylinder block assembly, an axial profile of the bearings may be shaped to be slightly convex. However, machining of one or more of the bearings and crankshaft to achieve the convex axial profile may be expensive and/or time consuming.

Figure 5:
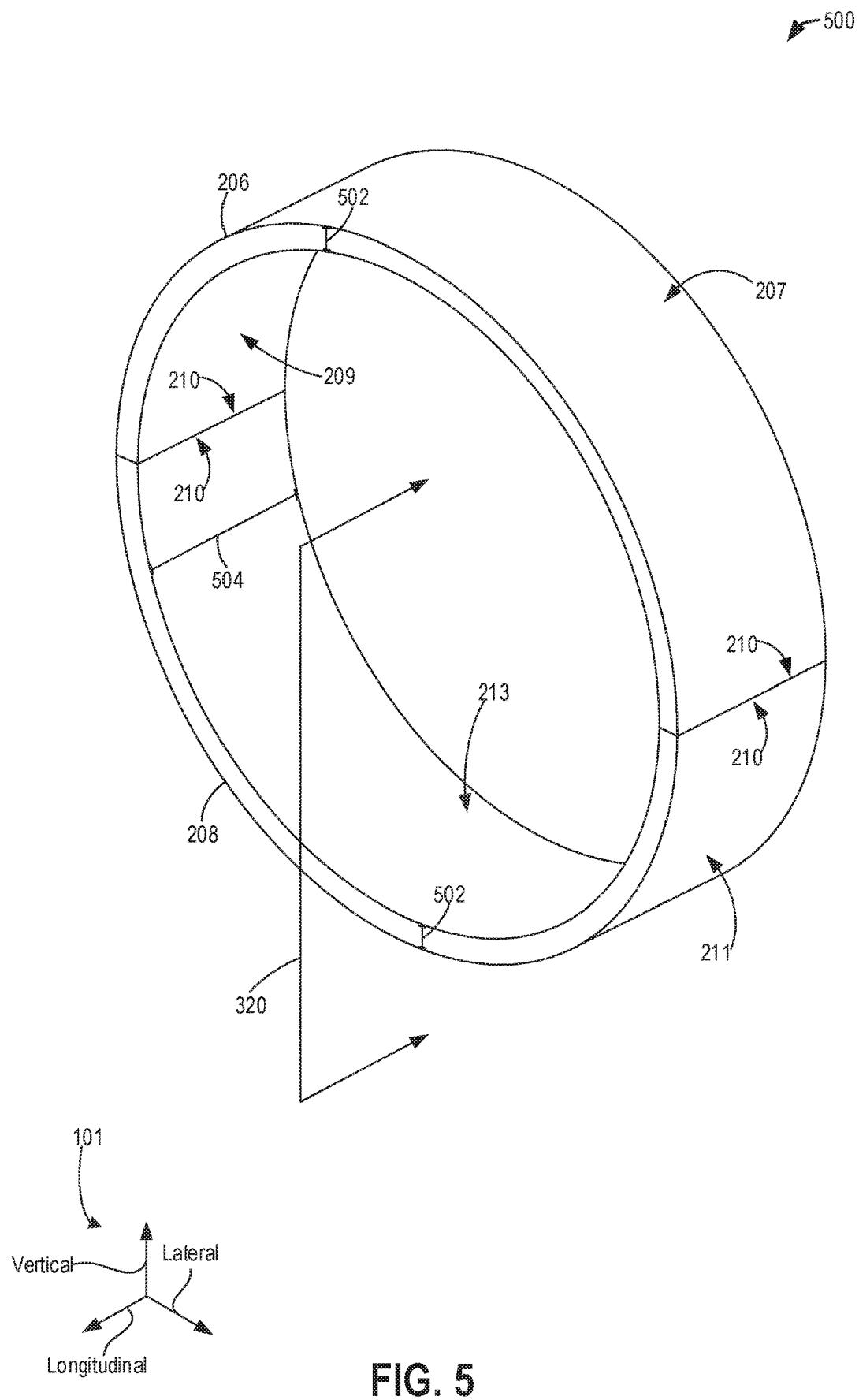
FIG. 5 shows a side perspective view of the main bearing shown in FIGS. 1-4.
Figure 6:
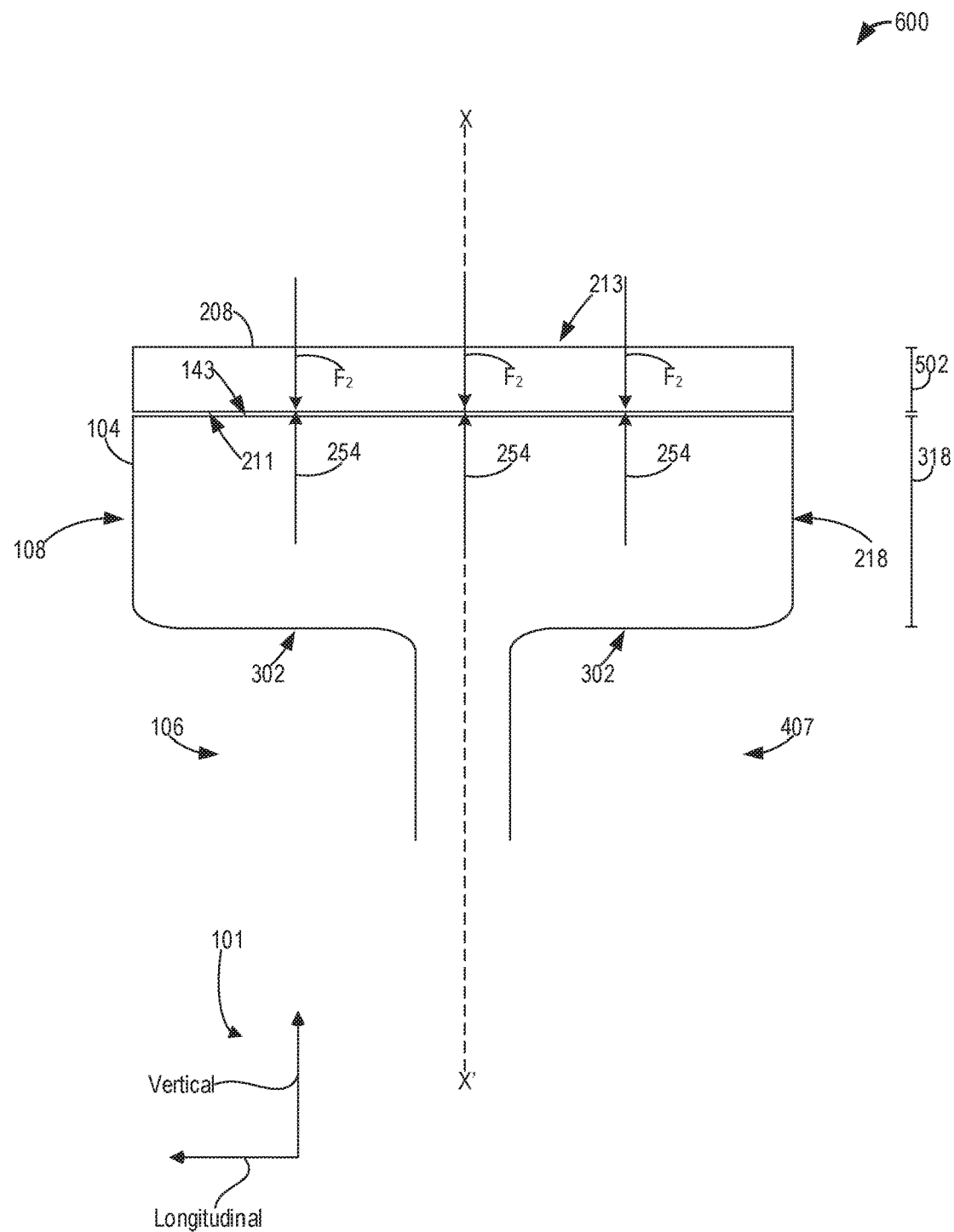
FIG. 6 shows a cross-sectional view of the main bearing and bearing caps shown in FIGS. 1-5.
Figure 7:
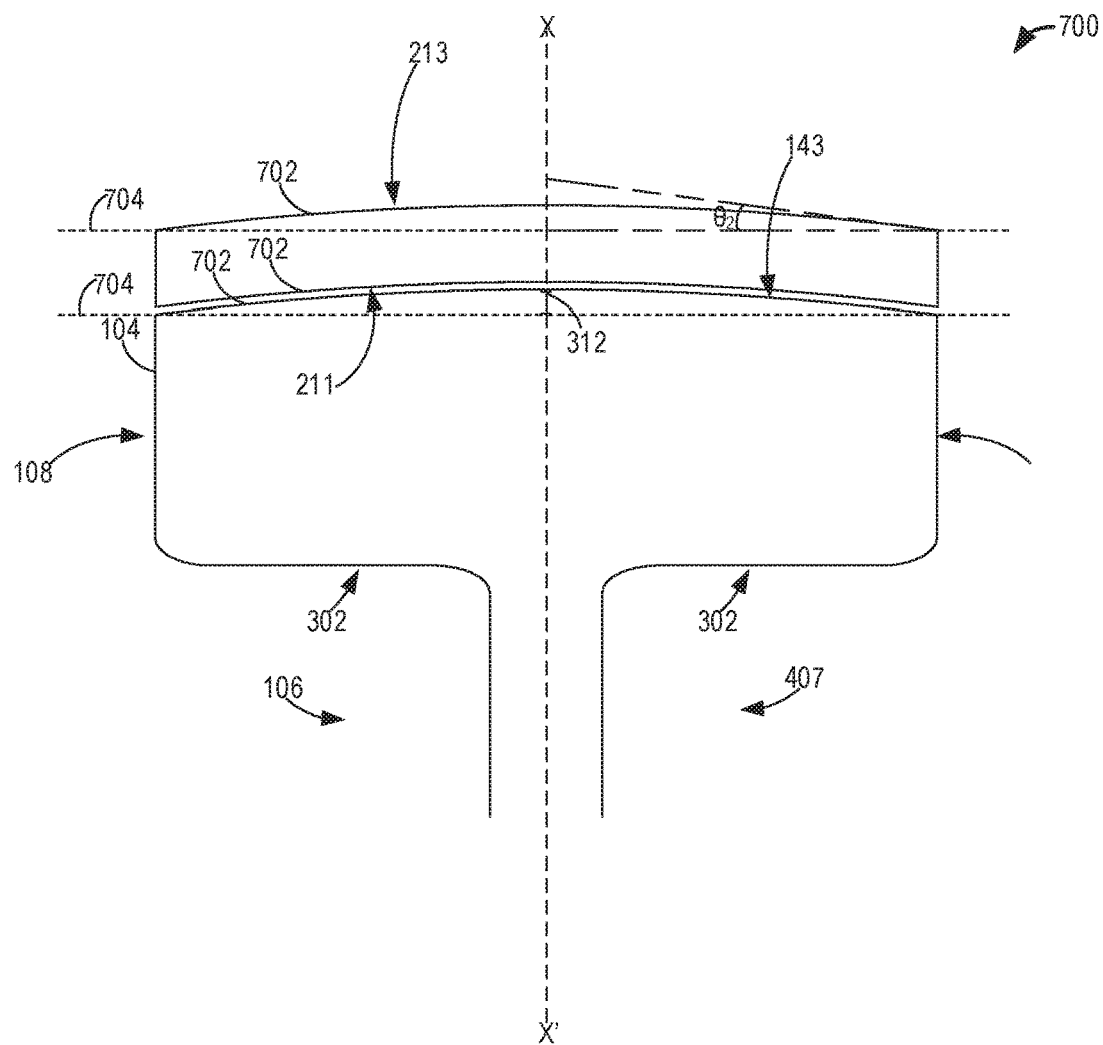
FIG. 7 shows a cross-sectional view of the main bearing and bearing caps after assembly of the cylinder block.
Figure 7:
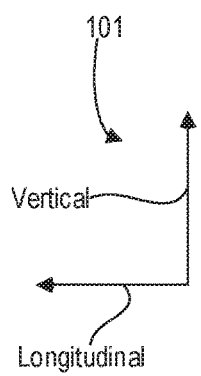

Thus, as shown in FIGS. 3-4 and 6-7, recesses may be included on opposite sides of the bearing caps, so that a compressive force exerted on the bearings when bolting the bearing caps to the cylinder block is differentially distributed across the axial profile of the bearings. Due to the differential force exerted across the axial profile of the bearings, the bearings may naturally deform to have a convex axial profile when bolting the main bearing caps to the cylinder block. An example of the main bearings before bolting of the bearing caps to the cylinder block is shown in FIG. 5, and an example of the main bearings after bolting of the bearing caps to the cylinder block is shown in FIG. 7. Thus, by including the recesses on the bearing caps, the desired convex shape of the bearings may be achieved when bolting the bearing caps to the cylinder block, and as such the cost and time to assembly the cylinder block assembly may be reduced.

FIGS. 1-7 show example configurations of a cylinder block assembly, with relative positioning of various components of the cylinder block assembly. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components laying in face-sharing contact with each other may be referred to as in face-sharing contact or physically contact one another. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, it shows an exploded perspective view of an example cylinder block assembly 2. As depicted, cylinder block assembly 2 includes cylinder block 4 positioned vertically above the structural frame 6. Pump 12 and oil pan 14 may be positioned vertically below the structural frame 6. Axis system 101 is included to aid in describing the relative positioning of components of the cylinder block assembly 2. Axis system 101 includes a longitudinal axis, lateral axis, and vertical axis. The lateral axis, horizontal axis, and vertical axis, may be orthogonal to one another, and as such may define a three dimensional coordinate system. A "length" of components of the assembly 2 may be used to describe the physical extent of components of the assembly 2 along the longitudinal axis. Further, a "width" of components of the assembly 2 may be used to describe the physical extent of components of the assembly 2 along the lateral axis. Similarly, a "height" of components of the assembly 2 may be used to describe the physical extent of components of the assembly 2 along the vertical axis. Although depicted in one example orientation in FIG. 1, it should be appreciated that the cylinder block assembly 2 may be positioned in other orientations when included in a vehicle.

The cylinder block 4 further includes a plurality of crankshaft supports 100 positioned at a bottom (e.g., vertical bottom of the cylinder block 4 with respect to the ground when coupled in an on-road vehicle) of the cylinder block 4 and configured to structurally support a crankshaft (e.g., crankshaft 240 shown below with reference to FIGS. 2A and 2B). In some examples, the cylinder block 4 may include two crankshaft supports. However, in other examples, the cylinder block 4 may include more or less than two crankshaft supports 100. One or more bearing caps 104 may be fastened to the crankshaft supports 100. Specifically, one bearing cap may be fastened via bolts to each of the crankshaft supports 100. The bearing caps 104 are configured to receive a crankshaft bearing (e.g., first and second main bearings 206 and 208 shown below with reference to FIGS. 2A-6). Thus, the crankshaft supports 100 and bearing caps 104 may be coupled to one another, forming substantially circular openings that are configured to receive the crankshaft bearings and crankshaft.

The crankshaft supports 100 may each include first thrust surfaces 141 which directly interface and physically contact the bearings. Similarly, the bearing caps 104 may include second thrust surfaces 143 which may directly interface and physically contact the bearings. Thus, the bearings may be positioned on interior facing surfaces of the crankshaft supports 100 and bearing caps 104. The bearings may be squeezed between the bearing caps 104 and cylinder block 4 as the bearing caps 104 are fastened to the cylinder block 4, and as such, the fastening of the bearing caps 104 to the cylinder block 4 may be referred to herein as "bearing crush." Specifically, the bearing caps 104 and cylinder block 4 exert a vertical compressive force on the bearings as the bolts fastening the bearing caps 104 and cylinder block 4 are tightened. This compressive force may cause small deformations and/or crushing of the bearings. As such, the bearings may be held in position by the compressive force exerted on the bearings by one or more of the bearing caps 104 and cylinder block 4. More specifically, the frictional forces acting between the thrust surfaces 141 and 143 and the bearings may restrict movement of the bearings relative to the caps 104 and the crankshaft supports 100. The crankshaft bearings may be configured to enable rotation of the crankshaft. It will be appreciated that the crankshaft may include various components such as counterweights, journals, crankpin journals, etc. The crankpin journals may each be coupled to a piston via a connecting rod. In this way, combustion in the cylinders may be used to rotate the crankshaft.

The bearing caps 104 may each include two structural recesses or pockets 106, shown in greater detail below with reference to FIGS. 2A-4. The recesses 106 may be configured to differentially distribute the compressive force applied to bearings across an axial profile of the bearings, as discussed in greater detail below with reference to FIGS. 2A-4. Thus, the amount of inward compressive force exerted on the bearings may vary along the longitudinal axis due to the inclusion of the pockets 106 within the bearing caps 104.

As shown, the recesses 106 may be positioned on the longitudinally opposed surfaces of the caps 104. Thus, each of the caps 104 may include two recesses 106, disposed on opposite sides of the caps 104. The recesses 106 therefore, may be positioned on a front first surface 108 of the bearing caps 104, and on an opposite back second surface (not shown in FIG. 1). However, in other examples, the recesses 106 may be positioned in another suitable location. Still further, in some examples the recesses 106 may have an alternate geometric configuration and/or orientation than shown in FIG. 1.

In some examples, the bearing caps 104 may be formed separately from the cylinder block 4. Thus, the bearing caps 104 and cylinder block 4 may be cast separately and then coupled to one another via bolts, with the bearings squeezed there-between. However, it should be appreciated that in other examples, the bearing caps 104 and cylinder block 4 may be formed out of one continuous piece of material. In other words, the crankshaft supports 100 and bearing caps 104 may be manufactured via a single casting.

Cylinder block 4 further includes an exterior front wall 110 opposite an exterior rear wall 112. The front wall 110 and rear wall 112 may include crankshaft supports 100 and bearing caps 104 as shown in the example of FIG. 1.

Continuing with FIG. 1, the cylinder block 4 may include a plurality of cylinders 114. Specifically, in the example shown in FIG. 1, the cylinder block 4 may include 6 cylinders 114. However, in other examples the cylinder block 4 may include more or less than 6 cylinders 114. The plurality of cylinders 114 may be conceptually divided into a first and a second cylinder bank (116 and 118). Cylinder bank 118 is shown in greater detail herein with regard to FIG. 18. As shown, the engine may be in a V configuration in which opposing cylinders in each of the respective cylinder banks are positioned at a non-straight angle with respect to one another. In this way, the cylinders are arranged in a V. However, other cylinder configurations are possible in other examples. A valley 120 may be positioned between the first and second cylinder banks (116 and 118) in the cylinder block 4. Oil cooler 60 may be positioned in the valley when the cylinder block assembly 2 is assembled. A gasket 119 may be positioned between the oil cooler 60 and the cylinder block 4.

Cylinder block 4 further includes a first cylinder head engaging surface 122 positioned at a top 123 of the cylinder block. Additionally in the depicted example, the cylinder block includes a second cylinder head engaging surface 124. However in other examples, the cylinder block may include a single cylinder head engaging surface. The first and second cylinder head engaging surfaces (122 and 124) may be configured to couple the cylinder block 4 to a cylinder head (e.g., cylinder head 202 shown below with reference to FIGS. 2A-2B). When coupled, the cylinder head and the cylinder block 4 the cylinders 114 may form combustion chambers in which combustion may be implemented. Additionally, a seal (e.g., gasket) may be positioned between the cylinder head and the first and second cylinder head engaging surfaces (122 and 124) to seal the cylinders 114.

Cylinder block 4 further includes a first structural frame engaging surface 126 and a second structural frame engaging surfaces 128 configured to attach to two corresponding cylinder block sidewall engaging surfaces (130 and 132) included in the structural frame 6 discussed in greater detail herein. The two structural frame engaging surfaces (126 and 128) are positioned on opposing sides of the cylinder block 4. As depicted, the structural frame engaging surfaces (126 and 128) include a plurality of fastener openings 134. The fastener openings 134 may be configured to receive fasteners such as bolts when coupled to the structural frame 6 discussed in greater detail herein with regard to FIGS. 2A-2B.

Cylinder block 4 further includes a first exterior sidewall 133 opposite a second exterior sidewall 135. The first exterior sidewall 133 extends from the first cylinder head engaging surface 122 to the first structural frame engaging surface 126 positioned between a centerline 139 of the plurality of crankshaft supports 100. Likewise, the second cylinder block exterior sidewall 135 extends from the second cylinder head engaging surface 124 to the second structural frame engaging surfaces 128 positioned between the centerline 139 of the plurality of crankshaft supports 100. As shown, the structural frame engaging surfaces (126 and 128) are substantially planar. However, in other examples, the structural frame engaging surface may have another geometric configuration. For example, the height of the structural frame engaging surfaces may vary.

Furthermore, the structural frame 6 includes a bottom surface 109 and two exterior sidewalls: a first structural frame exterior sidewall 136 and a second structural frame exterior sidewall 138. The first structural frame exterior sidewall 136 extends from the bottom surface 109 and includes the first cylinder block sidewall engaging surface 130. Likewise, the second structural frame exterior sidewall 138 extends from the bottom surface 109 and includes the second cylinder block sidewall engaging surface 132. Furthermore, the first and second structural frame exterior sidewalls (136 and 138) extend above a top of the crankshaft supports 100 when the cylinder block assembly 2 is assembled. Additionally, the bottom surface 109 is below the crankshaft supports 100. However, in other examples other configurations are possible. For example, the first and second structural frame exterior sidewalls (136 and 138) may not extend above a top of the crankshaft supports. As depicted, the structural frame has a U shape. However, in other examples, other shapes are possible. The cylinder block sidewall engaging surfaces (130 and 132) are configured to attach to the structural frame engaging surfaces (126 and 128) on the cylinder block 4 and are positioned on opposite sides of the structural frame 6. In the depicted example, the cylinder block sidewall engaging surfaces (130 and 132) form top surfaces of the structural frame. However, in other examples, other configurations are possible. The cylinder block sidewall engaging surfaces (130 and 132) include a plurality of fastener openings 140 along their lengths. As shown, the cylinder block sidewall engaging surfaces (130 and 132) are substantially planar and congruent a lateral and longitudinal plane. However, in other examples, alternate geometric configurations and orientations are possible. For example, the vertical height of the sidewall engaging surfaces may vary.

The structural frame may further include a front cover engaging surfaces (182 and 184) extending along at least a portion of the structural frame exterior sidewalls (136 and 138). A first seal 170 may be positioned between the first cylinder block sidewall engaging surface 130 and the first structural frame engaging surface 126. Likewise, a second seal 172 may be positioned between the second cylinder block sidewall engaging surface 132 and the second structural frame engaging surfaces 128. The first and second seals (170 and 172) may be substantially air and liquid tight. Exemplary seals include but are not limited to a gasket, an adhesive, etc.

The structural frame 6 includes an interior portion 142 adjacent to the crankshaft supports 100 when the cylinder block assembly 2 is assembled. The interior portion 142 includes fastener openings 144 configured to receive suitable fasteners such as bolts. As discussed in greater detail herein, the fasteners may extend through the fastener openings 144 into the bearing caps 104.

In some examples, cylinder block 4 and structural frame 6 may be constructed out of different materials. Specifically in one example, cylinder block 4 may be constructed out of a material having a greater strength to volume ratio than structural frame 6. However, in other examples, the cylinder block and structural frame may be constructed out of substantially identical materials. Exemplary materials that may be used to construct the cylinder block include a gray iron, compacted graphite iron, ductile iron, aluminum, magnesium, and/or plastic. Exemplary materials used to construct the structural frame include gray iron, compacted graphite iron, ductile iron, aluminum, magnesium, and/or plastic. In one particular example, the cylinder block may be constructed out of a compacted graphite iron and the structural frame may be constructed out of aluminum.

The cylinder block assembly 2 may further include oil pan 14 positioned vertically below the structural frame 6 and cylinder block 4. When assembled oil pump 12 may be coupled to an oil pan engaging surface, located on a bottom side of the structural frame 6. Moreover, the oil pump 12 includes oil pick-up 150 positioned in the oil pan 14 when the cylinder block assembly 2 is assembled and an outlet port 152 configured to deliver oil to an oil passage in the structural frame 6. In this way, the oil pump 12 may receive oil from the oil pan 14. The cylinder block assembly 2 may further include oil filter 10. The oil filter may be coupled to a plate body cooler 160. Plate body cooler 160 cools engine oil as it is circulated throughout the engine.

The cylinder block assembly 2 may further include oil pan 14. The oil pan 14 may include a third structural frame engaging surface 174 having fastener openings 176 for receiving fasteners. A seal 178 may be positioned between the third structural frame engaging surface 174 and an oil pan engaging surface included in the structural frame 6.

The structural frame 6 may further include a sensor mounting boss 180 for receiving a sensor, such as an oil pressure sensor. As shown the sensor mounting boss 180 is positioned on the first structural frame exterior sidewall 136. However, the sensor mounting boss may be positioned in another suitable location such as on the second structural frame exterior sidewall 138 in other examples.

Cutting plane 190 defines a cross-section of the assembly 2 shown below with reference to FIGS. 2A-4. The cutting plane 190 may be parallel to the plane defined by the vertical and lateral axes of the axis system.

Figure 2A:
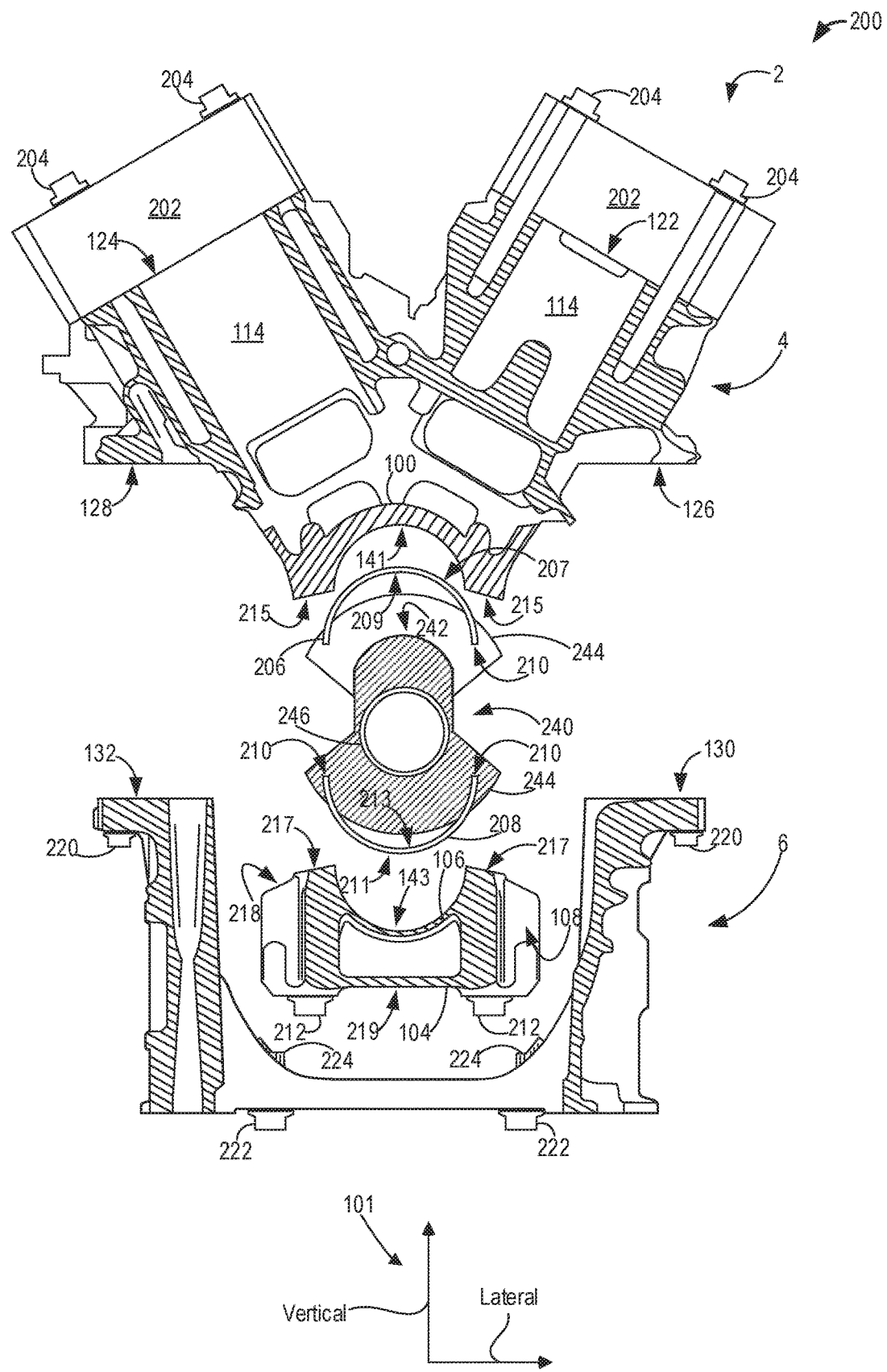
FIG. 2A shows an exploded cross-sectional view of the cylinder block assembly shown in FIG. 1.
Figure 2B:
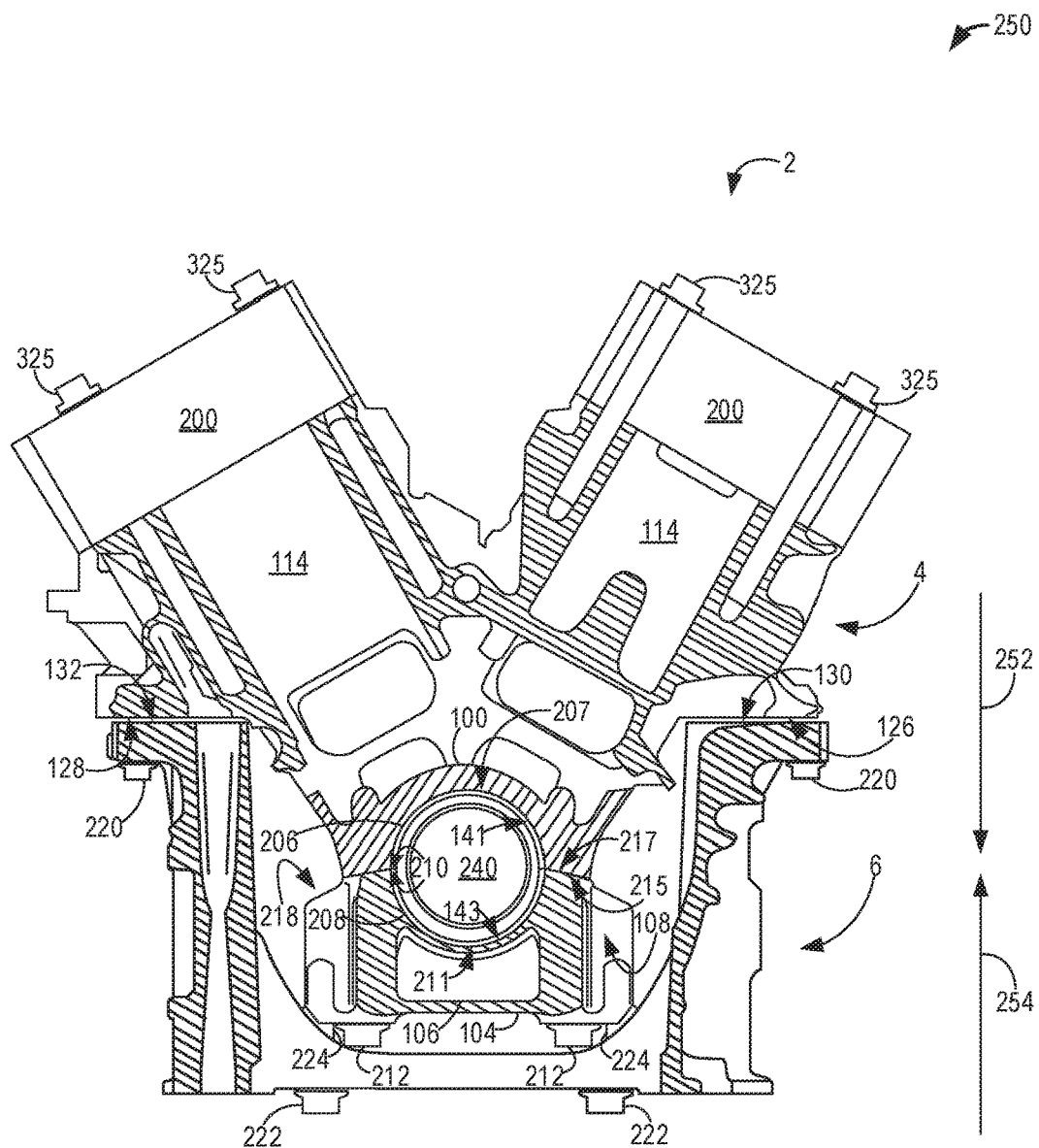
FIG. 2B shows a cross-sectional view of the cylinder block assembly shown in FIG. 1, assembled.
Figure 2B:
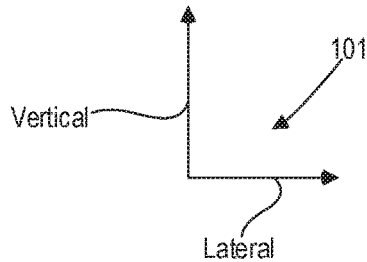

Turning now to FIGS. 2A and 2B, they show cross-sectional views of the cylinder block assembly 2 shown above with reference to FIG. 1 taken along cutting plane 190 (shown above with reference to FIG. 1). As such, components of the assembly 2 numbered similarly in FIGS. 2A and 2B as in FIG. 1 and already introduced and described in FIG. 1, may not be reintroduced in the description of FIGS. 2A and 2B herein. FIG. 2A shows an exploded view of the cylinder block 4, bearing caps 104, and structural frame 6. FIG. 2B shows an assembled view of the cylinder block 4, bearing caps 104, and structural frame, assembled and coupled together.

Focusing first on FIG. 2A, it shows an exploded cross-sectional view 200 of a portion of the assembly 2 including the structural frame 6, cylinder block 4, and one of the bearing caps 104. As shown in the example of FIG. 2A, a cylinder head 202 may be physically coupled to cylinder block 4. Specifically, a first set of bolts 204 may fasten the cylinder head 202 to the cylinder block 4, fluidically sealing the cylinders 114. Specifically, the cylinder head 202 may be physically coupled to the cylinder block 4 at the first and second cylinder head engaging surfaces 122 and 124. Thus, the bolts 204, may extend through the cylinder head 202, and into the cylinder block 4, securing the cylinder head 202 to the cylinder block 4.

The cylinders 144 may each include piston (not shown in FIGS. 2A and 2B), the pistons slidable within the cylinders 144 between a top dead center (TDC) position and a bottom dead center (BDC) position. Translational movement of the pistons may converted into rotational motion of a crankshaft 240. Specifically, the pistons may be coupled to crankpin journals 242 of the crankshaft 240 via a connecting rod (not shown in FIGS. 2A and 2B). The crankpin journals 242 and counterweights 244 of the crankshaft 240 may rotate around crankshaft main journals 246 as the crankshaft 240 rotates.

As described above with reference to FIG. 1, the crankshaft 240 may be supported and retained between the cylinder block 4 and the bearing caps 104. One or more bearings may be included between the first and second thrust surfaces, 141 and 143 respectively, and the crankshaft main journals 246 of the crankshaft 240. Specifically, an upper first main bearing 206 may be positioned between the crankshaft 240 and the first thrust surface 141 of the crankshaft supports 100 of the cylinder block 4. Further, a lower second main bearing 208 may be positioned between the crankshaft 240 and the second thrust surfaces 143 of the bearing caps 104. However, it should be appreciated that in some examples, the bearings may comprise a single piece, and may not comprise two distinct upper and lower bearings. Thus, in some examples, the lower second main bearing 208 and upper first main bearing 206 may be cast together to form a single, continuous bearing. Although one upper first main bearing 206 and one lower second main bearing 208 are shown in FIGS. 2A and 2B, it should be appreciated that one of each of the upper first main bearing 206 and lower second main bearing 208 may be included between each of the bearing caps 104 and crankshaft supports 100.

The bearings 206 and 208 may be shaped and sized approximately the same or similar to one another. However, in other examples, the bearings 206 and 208 may be shaped and/or sized differently. As shown in the example of FIGS. 2A and 2B, the bearings 206 and 208 may be shaped as semi-circular shells having inner and outer semi-circular surfaces. Thus, the bearings 206 and 208 may define an arc of circular disc, the arc defined by a central angle of approximately 180 degrees. The first main bearing 206 may therefore include outer first surface 207 and inner second surface 209. The inner second surface 209 may be concentrically positioned within the outer first surface 207. Thus, the arc length of the outer first surface 207 may be greater than that of the inner second surface 209. However, the central angle defining the surfaces 207 and 209 may be the same or similar. Similarly, the second main bearing 208 may include an outer first surface 211 and inner second surface 213. The inner second surface 213 may be concentrically positioned within the outer first surface 211. Thus, the arc length of the outer first surface 211 may be greater than that of the inner second surface 213. However, the central angle defining the surfaces 211 and 213 may be the same or similar.

The outer first surfaces 207 and 211 of the first and second main bearings 206 and 208, respectively, may physically contact and/or interface with the thrust surfaces 141 and 143. Specifically, the outer first surface 207 of the first main bearing may physically contact the thrust surface 141 of the crankshaft supports 100. Further, the outer first surface 211 of the second main bearing may physically contact the thrust surfaces 143 of the bearing caps 104. Further, the inner second surfaces 209 and 213 may physically contact and/or interface with the main journals 246 of the crankshaft 240. However, in some examples, the inner second surfaces 209 and 213 may be physically separated from the main journals 246 of the crankshaft 240 by a gap or clearance. In still further examples, only one of either the inner second surface 209 or the inner second surface 213 may be in physical contact with the main journals 246 of the crankshaft 240.

As described above with reference to FIG. 1, the thrust surfaces 141 and 143 may be approximately semi-circular. Thus, the thrust surfaces 141 and 143 may define an arc of a semi-circular disk, the arc having a central angle of approximately 180 degrees. The arc length of the thrust surfaces 141 and 143 may be approximately the same or similar. In some examples, the arc length of the thrust surfaces 141 and 143 may be approximately half of the total arch length of the main bearing bore. However, in some examples, the total arc length of the thrust surfaces 141 and 143 may be in a range of lengths between 120.0 mm to 400.0 mm depending on the main bearing bore diameter.

The bearings 206 and 208 may be sized to be slightly larger than the thrust surfaces 141 and 143. For example, the arc length of the outer first surfaces 207 and 211 of the bearings 206 and 208 respectively, may be greater than the arc length of the thrust surfaces 141 and 143 by approximately 0.1 mm.

In this way, when the bearing caps 104 are fastened to the cylinder block 4, a compressive force may be exerted on the oversized bearings. Specifically, the thrust surface 141 and cylinder block 4 may exert a downward force that points in the negative direction of the vertical axis (e.g., downward from top to bottom in FIGS. 2A-2B) on the upper first main bearing 206. Similarly, the thrust surfaces 143 and bearing caps 104 may exert an upward force that points in the positive direction of the vertical axis (e.g., upward from bottom to top in FIGS. 2A-2B). Thus, the cylinder block 4 and bearing caps 104 may exert forces in antiparallel directions, which may the bearings 206 and 208. Thus, due to the compressive force, the bearings 206 and 208 may bow outwards in the negative and positive lateral directions (e.g., left and right in FIGS. 2A-2B).

Ends 210 of the bearings 206 and 208 may be in physical contact with one another. Thus, when the ends 210 of the bearings 206 and 208 are in physical contact, the bearings 206 and 208 may conjoin to form a closed circular shell. The ends 210 may be displaced outwards in the negative and positive lateral directions upon application of the compressive force during bearing crush.

The pockets 106 may be formed on opposing sides of the bearing caps 104. Specifically, the pockets 106 may be included on the front first surface 108, and on an opposite back second surface 218 of the bearing caps 104. The pockets 106 may be recessed from the surfaces 108 and 218 of the bearing caps 104. Thus, the bearing caps 104 may be thinner at the pockets 106 than at areas of the bearing caps 104 not including the pockets 106. A more detailed description of the size and shape of the pockets is provided below with reference to FIGS. 3-4.

Main bearing bolts 212 may fasten the bearing caps 104 to the cylinder block 4. Thus, the main bearing bolts 212 may extend from a bottom 219 of the bearing caps 104, through the bearing caps 104, and into the cylinder block 4. A bottom surface 215 of the cylinder block 4 may physically contact a top surface 217 of the bearing caps 104 when the bearing caps 104 are fastened to the cylinder block 4.

Further, the cylinder block 4 and bearing caps 104 may be fastened to the structural frame 6 via a second and third set of bolts 220 and 222, respectively. Specifically, as shown in FIG. 2B, the cylinder block sidewall engaging surfaces 130 and 132 are configured to interface with and physically contact the structural frame engaging surfaces 126 and 128 on the cylinder block 4. The second set of bolts 220 may extend through the structural frame 6 and into the cylinder block 4, passing through surfaces 126 and 130, or 128 and 132. The third set of bolts 222 may extend through the structural frame 6, and into the bearing caps 104. Specifically, the structural frame 6 may include bearing cap supports 224, on which the bearing caps 104 may sit. Thus, supports 224 may provide an interface between the bearing caps 104 and structural frame 6 that may serve to provide a sufficient surface area for the bearing caps 104 to contact the structural frame 6. The third set of bolts 222 may extend through the supports 224 and into the bearing caps 104.

Turning now to FIG. 2B, it shows an assembled view 250 of the cylinder block 4, structural frame 6, one of the bearing caps 104, crankshaft 240, and cylinder head 202. Thus, as shown in FIG. 2B, the bearing caps 104 are fastened to the cylinder block 4 via the main bearing bolts 212, crushing the bearings 206 and 208 there-between. By tightening the main bearing bolts 212 a vertical compressive force may be exerted on bearings 206 and 208. Specifically, the compressive force may act in the vertical direction, parallel to the vertical axis. The cylinder block 4 may exert a downward force on the bearings 206 and 208 as shown by first force arrow 252. Further, bearing caps 104 may exert an upward force on the bearings 206 and 208 as shown by second force arrow 254. Thus, the force arrows 252 and 254 may represent the compressive forces acting on the bearings 206 and 208. In some examples the bolts 212 may be tightened to a fully tightened position at which the bolts 212 are not further tightened, and a final compressive force is exerted on the bearings 206 and 208. The final compressive force that the bolts may be tightened to may be approximately 20 kN. However, in other examples, the final compressive force may be in a range between 18 kN and 60 kN.

As the main bearing bolts 212 are tightened, the downward force exerted on the upper first main bearing 206 by the cylinder block may increase. Similarly, the upward force exerted on the lower second main bearing 208 by the bearing caps 104 may increase. The compressive forces exerted on the bearings 206 and 208 by the cylinder block 4 and bearing caps 104 may cause the bearings 206 and 208 to bow outwards at their ends 210, where the bearings 206 and 208 contact one another. Specifically, the ends 210 may bow outwards in the lateral direction. As such, prior to bolting of the bearings caps 104 to the cylinder block 4, the bearings 206 and 208 may each be semicircular. However, after tightening of the bolts 212 and application of the compressive force, the bearings 206 and 208 may bend to have an elliptic shape, where the major axis may extend along the lateral axis, and the minor axis may extend along the vertical axis.

The cylinder block 4 and bearing caps 104 interface with one another and physically contact one another along surfaces 215 and 217. The outer first surface 207 of the first main bearing 206 may physically contact the thrust surface 141. Similarly, the outer first surface 211 of the second main bearing 208 may physically contact the thrust surfaces 143.

The bearing caps 104 may rest on the supports 224. The third set of bolts 222 may couple the structural frame 6 to the bearing caps 104. Further, the second set of bolts 220 may couple the structural frame 6 to the cylinder block 4. As such, the structural frame 6 and the cylinder block 4 may interface with one another and contact one another along surfaces 128 and 132 and along surfaces 126 and 130.

Figure 3:
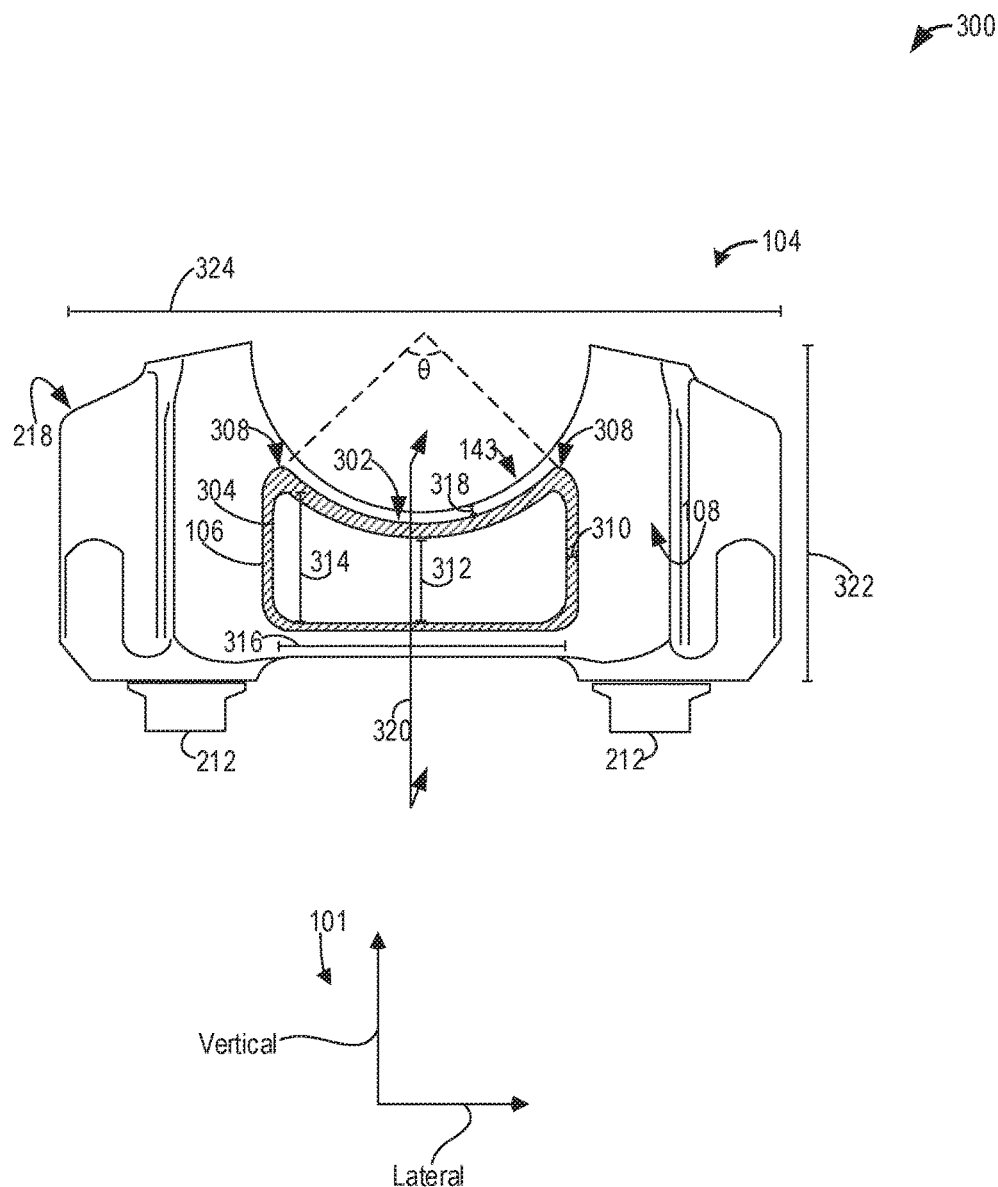
FIG. 3 shows an end view of the main bearing cap shown in FIGS. 1-2B.

Referring now to FIG. 3, it shows a front view 300 of one of the bearing caps 104. As such, components of the bearing caps 104 already introduced above with reference to FIGS. 1-2B, may not be reintroduced or described in the description of FIG. 3 herein. The axis system 101 is included, with the vertical axis pointing from the bottom to the top of FIG. 3, and the lateral axis pointing from left to right. Although only front first surface 108 is shown in FIG. 3, it should be appreciated that back second surface 218 is the same or similar to the front first surface 108. Said another way, the back second surface 218 may be the same as front first surface 108. The first and second surfaces, 108 and 218 respectively, each comprise one of the recesses 106.

As depicted in FIG. 3, the recesses 106 may include a recessed surface 304 that may be inset from the exterior surfaces of the bearing caps 104. A depth 310 of the recesses 106 may in some examples be approximately 3.0 to 5.0 mm and/or may be ⅓ of the total length of the bearing caps 104. In still further examples, the depth 310 of the recesses 106 may be any depth in a range between 2.0 mm and 6.0 mm.

A leading edge or top 302 of the recesses 106 may be spaced a constant distance 318 from the thrust surfaces 143 of the bearing caps 104. In some examples, the distance 318 between the leadings edge 302 of the recesses 106 and the thrust surfaces 143 may be approximately 5.0 mm. However, in other examples, the distance 318 may be any distance between 3.0 mm and 10.0 mm. As such the shape of the leading edge 302 may conform substantially to the shape of the thrust surfaces 143. Thus, the leading edge 302 may form an arc of a circle, the arc defined by a central angle θ. In some examples, the central angle θ may be approximately 100 degrees. However, in other examples, the central angle may be a central angle between 60 degrees and 170 degrees. Curved apexes 308 may be formed at the ends of the leading edge 302 and a top of the recesses 106. Thus, the curved apexes 308 may define the length of the leading edge 302.

A width 316 of the recesses 106 may be approximately ½ of a total width 324 of the bearing caps 104. However, in other examples, the width 316 may be between ¼ and ¾ of the total width 324 of the bearing caps 104. The height of the recesses 106 may vary along the width of the recesses 106 due to the curvature of the leading edge 302.

In some examples, a minimum height 312 of the recesses 106 may be approximately ⅓ of a total height 322 of the bearing caps 104. However, in other examples, the minimum height 312 may be between ⅛ and ½ of the total height 322 of the bearing caps 104.

Figure 4:
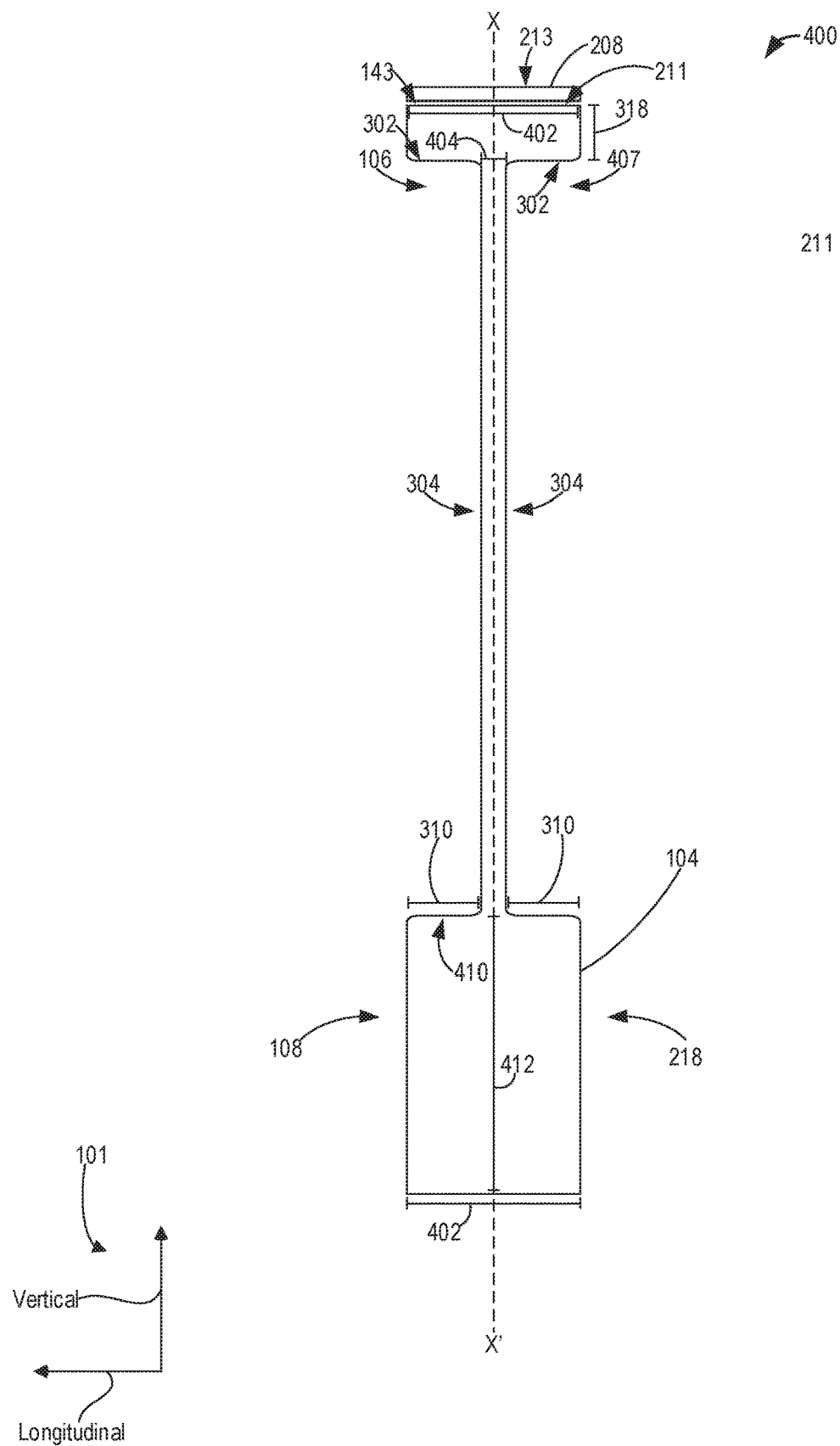
FIG. 4 shows a cross-sectional view of the main bearing cap shown in FIGS. 1-3.

Turning now to FIG. 4, it shows a cross-sectional view 400 of one of the bearing caps 104 and one of the lower second main bearing 208. Specifically, FIG. 4 shows a cross section of one of the bearing caps 104 taken along cutting plane 320 shown above with reference to FIG. 3. As such, components of the bearing caps 104 and second main bearing 208 already introduced above with reference to FIGS. 1-3, may not be reintroduced or described in the description of FIG. 4 herein. Axis system 101 is included in FIG. 4, where the vertical axis points from bottom to top in FIG. 4, and the longitudinal axis points from right to left. A central axis X-X' of the bearing caps 104 is shown extending vertically in FIG. 4, parallel to the vertical axis of the axis system 101. The central axis X-X' may equally divide the bearing caps 104 in half. Said another way, the bearing caps 104 may be approximately symmetric about the central axis X-X.' The central axis X-X' may define a plane that is parallel to the plane defined by the vertical and lateral axes shown above with reference to FIGS. 1-3. Thus, the central axis X-X' may define a plane that is parallel to cutting plane 190 described above with reference to FIG. 1. As such, central axis X-X' may be orientated parallel to the vertical axis, and may extend along the lateral axis.

As depicted in FIG. 4, each of the bearing caps 104 may include two recesses: one at the front first surface 108, and one at the back second surface 218. Specifically, the first surface 108 may include one of the first recesses 106, and the second surface 218 may include a second recess 407. The second recess 407 may be the same or similar to the first recesses 106. Thus, the size and position of the second recess 407 relative to the second surface 218 may the same as the first recesses 106 on the first surface 108. Further, since the bearing caps 104 may be symmetric about the central axis X-X,' it should be appreciated that the second surface 218 may be sized and orientated the same or similar to the first surface 108. As such, the depth of the recesses 106 and 407 may be the same and may be depth 310.

Thus, the depth 310 of the recesses 106 and 407 may in some examples be approximately 8.0 mm and/or may be ⅓ of a larger first length 402 of the bearing caps 104. Length 402 of the bearing caps 104, may be the distance between the first surface 108 and the second surface 218 as shown in the example of FIG. 4. In some examples, the length 402 may be approximately 22.0 mm. However, in other examples, the length 402 may be a length between 15.0 and 50.0 mm.

In still further examples, the depth 310 of the recesses 106 may be any depth in a range between 2.0 mm and 10.0 and/or may be between 10% and 40% of the first length 402 of the bearing caps 104.

As such, a smaller second length 404 of the bearing caps 104 may be formed at the recesses 106 and 407. In some examples, the smaller second length 404 may be approximately 6.0 mm. However, in other examples, the length 404 may be a length between 4.0 mm and 20 mm. Thus, the length of the bearing caps 104 may be less at the recesses 106 and 107, than between the first surface 108 and second surface 218. Said another way, the length of the bearing caps 104 may not be uniform along the vertical height of the bearing caps 104. Specifically, the second length 404 at the recesses 106 and 407 may be less than the first length 402 at portions of the bearing caps 104 not including the recesses 106 and 407.

Thus, the length of the bearing caps 104 may be the first length 402 between the leading edge 302 of the recesses 106 and 407, and the thrust surfaces 143. Said another way, the length of the bearing caps 104 along the distance 318 may be constant, and may be approximately the first length 402. Further, the length of the bearing caps 104 may be the first length 402 between a bottom edge 410 of the recesses 106 and 407, and the bottom 219 of the bearing caps 104. Said another way, the length of the bearing caps 104 between the bottom edge 410 of the recesses 106 and 407, and the bottom 219 of the bearing caps 104 may be constant, and may be the same as along distance 318. In this way, the first surface 108 and second surface 218 may be parallel and substantially planar surfaces. Similarly, the recessed surface 304 of each of the recesses 106 and 407 may be substantially planar and parallel to one another. Further, each recessed surface 304 may be parallel to the first surface 108 and second surface 218.

The bottom edge 410 may be positioned a second distance 412 from the bottom 219 of the bearing caps 104. In some examples the second distance 412 may be approximately 10.0 mm. However, in other examples, the second distance 412 may be any distance between 5.0 mm and 20.0 mm.

As depicted in FIG. 4, the thrust surfaces 143 may be substantially flat and planar along the longitudinal axis prior to tightening of main bearing bolts (e.g., bolts 212 shown in FIGS. 2A-3) and application of the bearing crush compressive force. Similarly, the surfaces 211 and 213 of the bearing 208 may be substantially flat and planar along the longitudinal axis prior to tightening of the main bearing bolts.

Turning now to FIG. 5, it shows a side perspective view 500 of the bearings 206 and 208. As such, components of the bearings 206 and 208 already introduced above with reference to FIGS. 1-4, may not be reintroduced or described in the description of FIG. 5 herein.

The bearings 206 and 208 may have a relatively constant thickness 502 and length 504. Further, the length of the bearings 206 and 208 may be the same and the thickness of the bearings 206 and 208 may be the same. Specifically, the thickness 502 may be approximately 2.5 mm. However, in other examples, the thickness 502 may be any thickness in a range between 1.5 mm and 4.0 mm. The length 504 may be the same or similar to the length of the bearing caps 104 (shown above with reference to FIG. 4). However, in other examples, the length 504 may be greater or less than length 402 (shown above with reference to FIG. 4) of the bearing caps 104. Cutting plane 320 defines a cross-section of the bearing 208 shown below in FIG. 6. Thus, FIG. 6 may therefore show a cross-sectional view of the bearing 208 and bearing caps 104 when assembled.

Turning now to FIGS. 6 and 7, they show cross-sectional views of the bearing 208 and bearing caps 104 before and after bolting of the bearing caps 104 to a cylinder block (e.g., cylinder block 4 shown above with reference to FIGS. 1-3). Specifically, FIG. 6 shows a cross-sectional view 600 of the bearing 208 and one of the bearing caps 104, taken along cutting plane 320, shown above with reference to FIGS. 3 and 5, before the bearing caps 104 are bolted to the cylinder block. FIG. 7, shows a similar a cross-sectional view to that shown in FIG. 6, of the bearing 208 and one of the bearing caps 104, taken along cutting plane 320. However, FIG. 7, shows the bearing caps 104 and bearing 208 after the bearing caps 104 have been bolted to the cylinder block 4 and application of the compressive force. During bolting of the bearing caps 104 to the cylinder block 4, the thrust surfaces 143 of the bearing caps 104 may bend causing the convexity of the axial profile of the bearings to increase.

Components of the bearing 208 and bearing caps 104 already introduced above with reference to FIGS. 1-5, may not be reintroduced or described in the description of FIGS. 6 and 7 herein. Axis system 101 is included in FIGS. 6 and 7, where the vertical axis points from bottom to top in FIGS. 6 and 7, and the longitudinal axis points from right to left.

Specifically, FIG. 6 depicts the compressive forces exerted on the bearing 208 by the bearing caps 104 during bearing crush. Thus, as the main bearing bolts (e.g., bolts 212 shown in FIGS. 2A-3) are tightened, the thrust surfaces 143 of the lower second main bearing 208 may exert an upward compressive force in the positive vertical direction on the bearing 208 as shown by force arrow 254. Thus, the compressive force at each point along the perimeter of the bearing 208, may point upwards in the vertical direction during bearing crush.

Further, since the thrust surfaces 143 and outer first surface 211 of the bearing 208 may be substantially planar, the force exerted on the bearing 208 during bearing crush may be uniform along an axial profile of the bearing 208. Thus, the compressive force may be symmetric about the central axis X-X.' That is, the magnitude of the compressive force may be the same for points along the axial profile of the bearing 208 positioned an equal distance from the central axis X-X,' and opposite on another on the central axis X-X.' However, in other examples, the thrust surfaces 143, and/or the outer first surface 211 may not be planar, and as such the compressive force exerted on the bearing 208 may vary along the axial profile of the bearing 208.

As the compressive force increases as the bolts (e.g., bolts 212 shown above with reference to FIGS. 2A-3) fastening the bearing caps 104 to the cylinder block (e.g., cylinder block 4 shown above with reference to FIGS. 1-2B) are tightened, the bearing 208 may exert an opposite and approximately equal opposing force on the bearing caps 104. This opposing force, that is perpendicular to the surface of contact between the thrust surfaces 143 and the surface 211 of bearing 208 and opposite the compressive force may commonly referred to as the normal force. That is, the bearing 208 may exert a normal force or contact force on the bearing caps 104, opposite the compressive force exerted on the bearing 208 by the bearing caps 104 in accordance with Newton's third law. Further, the normal force, as shown by the force arrows $F_2$ in FIG. 6, exerted on the bearing caps 104 by the bearing 208 may increase in proportion to increases in the compressive force. More simply, the normal force as shown by force arrows $F_2$ may be the same magnitude as the compressive force. Since the length of the bearings 208 may be approximately the same as that of the thrust surfaces 143, the normal force may be distributed across the surface area and axial profile of the thrust surfaces 143. When the compressive force, and therefore the normal force, increases above a threshold such as when tightening the main bearing bolts, the thrust surfaces 143 may begin to bend to a more convex axial profile, where the ends of the thrust surfaces 143 nearer the surfaces 108 and 218 may bend towards the recesses 106 and 407, and where the surfaces 143 nearer the central axis X-X' may bend in the opposite direction away from the recesses 106 and 407.

Due to the recesses 106 and 407, the rigidity of the thrust surfaces 143 may vary along the axial profile of the bearing caps 104. That is, the mechanical support of the thrust surfaces 143 in the vertical direction may be greater at the central axis X-X' than at the edges of the surfaces 143 more proximate the surfaces 108 and 218. Said another way, the bearing caps 104 may be able to handle higher vertical forces without bending, nearer the central axis X-X' than farther away from the central axis X-X.' Due to the reduced mechanical support of the thrust surfaces 143 in the vertical direction above the recesses 106 and 407 and towards the first and second surfaces 108 and 218, the thrust surfaces 143 may bend during bearing crush as the main bearing bolts are tightened.

Specifically, the ends of the thrust surfaces 143 may bend outwards, away from a crankshaft (e.g., crankshaft 240 shown above with reference to FIGS. 2A-2B), and more central portions of the thrust surfaces 143 more proximate the central axis X-X' may bend inwards toward the crankshaft. The thrust surfaces 143 may bend along the longitudinal axis to a more convex axial profile when the compressive force and therefore normal force increases above a threshold. In some examples, the threshold may be less than the final compressive force exerted after fully tightening the main bearing bolts. Thus, the thrust surfaces 143 may begin to bend at compressive forces between 1.0 kN and 5.0 kN. Thus, the thrust surfaces 143 and/or portion of the bearing caps 104 included between the leading edge 302 and thrust surfaces 143 may bend to a more convex shape as the bolts are tightened and the bearing caps 104 are fastened to the cylinder block, and before the bolts are tightened to their fully tightened position at which the final compressive force is exerted on the bearings 206 and 208.

As the thrust surfaces 143 bend, the compressive force may become unevenly distributed across the axial profile of the bearing 208. That is, the compressive force may become greater nearer the central axis X-X' and less more proximate the surfaces 108 and 218, because of the curvature of the thrust surfaces 143.

By increasing the depth of the recesses 107 and 407 and/or decreasing the distance 318 between the leading edge 302 of the recesses and the thrust surfaces 143, the bending and therefore the convexity of the axial profile of the bearing 208 may be increased during bearing crush. Said another way, the flexibility of the portion of the bearing caps 104 included between the recesses and the thrust surfaces 143 may increase. As such, the thrust surfaces 143 may bend at lower compressive forces.

Focusing now on FIG. 7, it shows a cross-sectional view 700 of the bearing 208 and one of the bearing caps 104 taken along cutting plane 302 after bearing crush and tightening of the main bearing bolts (e.g., main bearing bolts 212 shown in FIGS. 2A-3). As such, components of the bearing 208 introduced above with reference to FIGS. 1-6, may not be reintroduced or described in the description of FIG. 7 herein. Axis system 101 is included in FIG. 7, where the vertical axis points from bottom to top in FIG. 7, and the longitudinal axis points from right to left.

As described above with reference to FIG. 6, due to the recesses in the bearing caps 104, the rigidity of the thrust surfaces 143 may be reduced. Said another way, the flexibility of the thrust surfaces 143 may be increased. As the bearing caps 104 are bolted and tightened to the cylinder block, the force exerted on the thrust surfaces 143 by the bearing 208 increases. However, due to the recesses 106 and 407, the thrust surfaces 143 and bearing caps 104 may bend under lower compressive forces. That is, the thrust surfaces 143 may begin to bend when the compressive force increases above a threshold, where the threshold may represent a compressive force less than the final compressive force exerted when the bolts are tightened to their fully tightened position. More specifically, the portion of the bearing caps 104 included between the leading edge 302 of the recesses 106 and 407 and the thrust surfaces 143 may be less rigid and more flexible because of the recesses 106 and 407. The structural support of the thrust surfaces 143 in the vertical direction may be less nearer the surfaces 108 and 218 and greater closer to the central axis X-X.' Said another way, the edges of the thrust surfaces 143 more proximate the surfaces 108 and 218 of the bearing caps 104 may bend at lower compressive forces than nearer the central axis X-X' due to the inclusion of the recesses 106 and 407.

When, the thrust surfaces 143 begin to bend to a more convex axial profile, the compressive force exerted on the bearing 208 by the bearing caps 104 may then vary along the longitudinal axis or axial profile of the bearing 208 during bearing crush. Specifically the inward compressive force may be greater nearer the central axis X-X' of the bearing 208 as the thrust surfaces 143 begin to bend to a convex shape due to the recesses 106 and 407. Thus, as shown in the example of FIG. 7, the thrust surfaces 143 and bearing 208 may bow to a more convex shape. As, the thrust surfaces 143 begin to bend, the surface area of the contact surface between the thrust surfaces 143 and the outer first surface 211 may decrease. As shown in the example of FIG. 7, the edges of the thrust surfaces 143 near the surfaces 108 and 218 may bend downward, and regions more proximate the central axis X-X' may bend upwards. Thus, only the topmost regions of the thrust surfaces 143 may contact the outer first surface 211 of the bearing 208. As such, the compressive force exerted on the bearing 208 at the point of contact with the thrust surfaces 143 may increase since, the area of contact may decrease. More specifically, the compressive force exerted on the surface 211 nearer the central axis X-X' may increase and may decrease nearer the edges of the bearing 208. In this way, the bearing 208 may begin to bend in the same manner as the thrust surface 143 due to the change in the distribution of the compressive force along the longitudinal axis of the bearing 208.

The dashed lines in FIG. 7 represent the surfaces 243 and 213 prior to the bearing crush and application of the compressive force. As elaborated above with reference to FIGS. 4-6, the surfaces 211 and 213 of the bearing 208 may be substantially flat and planar along the longitudinal axis. However, during and after bearing crush the bearing 208 may deform to a slightly convex shape due to one or more of the bending of the thrust surfaces 143 and subsequent variation in the magnitude of the compressive force along the axial profile of the bearing 208. Thus, the thrust surfaces 143 may bend to be slightly convex along the axial profile of the thrust surfaces 143. Correspondingly, the surfaces 211 and 213 of the bearing 208 may conform to the shape of the thrust surfaces 143, and as such may change to be convex instead of planar during and/or after bearing crush.

Specifically, the bearing 208 and thrust surfaces 143 may deform such that the surfaces 143, 211, and 213 extend inward towards a crankshaft (e.g., crankshaft 240 shown in FIGS. 2A-2B). Thus, the inward displacement of the surfaces 143, 211, and 213 may be greater towards the central axis X-X,' and may be greatest at the central axis X-X.' In some examples the surfaces 143, 211, and 213 may be displaced approximately 3 μm at the central axis X-X' before and after bearing crush. However, in other examples, the surfaces 143, 211, and 213 may be displaced between 0.5 μm and 5.0 μm at the central axis X-X' before and after bearing crush. Thus, the surfaces 143, 211 and 213 may bend during bearing crush, and after tightening of the bolts and application of the final compressive force, the surfaces 143, 211, and 213 may define a curvature 702. Curvature 702 may define an arc of a circle, where the length of the arc is equal to length 402 of the bearing caps 104 and length 504 of the bearing 208. The radius of the circle defined by the curvature 702 may be approximately 27,000.00 mm. Further, the central angle of the arc defined by the curvature 702 may be approximately 0.05 degrees.

Said another way, a bend angle $\theta_2$ of the surfaces 143, 211, and 213 may be approximately 0.025 degrees. That is, the surfaces 143, 211, and 213 may be bend by an amount equivalent to the bend angle $\theta_2$. The bend angle $\theta_2$ may represent the amount of bend of the surfaces 143, 211, and 213 before and after application of the compressive force. Said another way, the bend angle $\theta_2$ may define the amount of bending of curvature 702 relative to the flat, planar, profiles depicted by the dotted lines 704 in FIG. 7.

In this way, an engine block assembly may comprise a cylinder block, and a bearing cap bolted to the cylinder block, the bearing cap comprising, a first recess included in a first surface, a second recess included in a second surface opposite the first surface, and a thrust surface interfacing with a crankshaft bearing, where a rigidity of the thrust surface may vary along an axial profile of the thrust surface due to the first and second recesses. A top of the first and second recesses may be positioned a constant distance from the thrust surface. In some example, the constant distance may be approximately 5.0 mm. In any one or combination of the above engine block assemblies, the first and second recesses may extend inwards from the first and second surfaces respectively, forming recessed walls within the bearing cap. In any one or combination of the above engine block assemblies the recessed walls may be separated by a distance of approximately 6.0 mm. In any one or combination of the above engine block assemblies the rigidity of the thrust surface may be greater more proximate a central axis of the bearing cap. In any one or combination of the above engine block assemblies the thrust surface may bend to a more convex axial profile when bolting the bearing cap to the cylinder block. In any one or combination of the above engine block assemblies the thrust surface may exert a compressive force on the crankshaft bearing, where the compressive force may be greater nearer a central axis of the crankshaft bearing. In another representation, a crankshaft main bearing cap may comprise a first recess included on a front surface of the bearing cap, a second recess included on a back surface, opposite the front surface, a semicircular thrust surface for retaining a crankshaft, where a flexibility of the thrust surface may vary along an axial profile of the thrust surface, and a thrust bearing adapted to interface with the thrust surface and a main journal of the crankshaft. The thrust surface of the crankshaft main bearing cap may be flat along the axial profile of the thrust surface. In any one or combination of the above crankshaft main bearing caps, a convexity of the thrust surface along the axial profile of the thrust surface may increase when bolting the bearing cap to a cylinder block. In any one or combination of the above crankshaft main bearing caps a compressive force exerted on the thrust bearing by the thrust surface may be greater nearer a central axis of the thrust bearing. In any one or combination of the above crankshaft main bearing caps a convexity of the bearing along an axial profile of the bearing may increase when bolting the bearing cap to a cylinder block. In any one or combination of the above crankshaft main bearing caps each of the first and second recesses may include a curved top, where the curved top may conform to the shape of the thrust surface such that the curved top forms an arc of a circle, where the top may be spaced a constant distance from the thrust surface. In any one or combination of the above crankshaft main bearing caps the first recess may extend inwards from the front surface towards a central axis of the bearing cap, defining a depth of the recess, where the depth of the recess is approximately 7.0 mm. In any one or combination of the above crankshaft main bearing caps the second recess may extend inwards from the back surface towards a central axis of the bearing cap, defining a depth of the recess, where the depth of the second recess is approximately 7.0 mm.

In yet another representation, an engine block assembly may comprise a cylinder block, a crankshaft, a bearing cap bolted to the cylinder block, the bearing cap comprising, a first recess extending inwards from a front first surface of the bearing cap, a second recess extending inwards from a second surface opposite the first surface, and a thrust surface, where a mechanical strength of the thrust surface may be greater nearer a central axis of the thrust surface, and a crankshaft bearing positioned between the crankshaft and the bearing cap, and where a first surface of the bearing may interface with the thrust surface, and where an opposite second surface of the bearing may interface with a main journal of the crankshaft. In any one or combination of the above crankshaft main bearing caps a depth of the first recess may be approximately a third of a length of the bearing cap. In any one or combination of the above crankshaft main bearing caps a depth of the second recess may be approximately a third of a length of the bearing cap. In any one or combination of the above crankshaft main bearing caps the thrust surface may exert a greater compressive force on the bearing nearer a central axis of the bearing when the bearing caps is bolted to the cylinder block.

In this way, a technical effect of increasing a convexity of an axial profile of a crankshaft main bearing is achieved by including two recesses positioned on opposite sides of a crankshaft main bearing cap. The recesses may be sized, shaped, and positioned within the main bearing caps, such that during bearing crush, where the main bearing caps are bolted to a cylinder block, the compressive force exerted on the main bearings by the bearing caps and cylinder block varies along the axial profile of the bearings. Specifically, the force may be greater towards a central axis of the bearings. As such, the convexity of the axial profile of the main bearings may be achieved during bearing crush, and expensive and time consuming machining of the bearings and/or crankshaft may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine block assembly comprising:
   a cylinder block;
   a crankshaft bearing; and
   a bearing cap bolted to the cylinder block, the bearing cap comprising:
      a first recess extending from an exterior first surface of the bearing cap into the bearing cap in a direction of a longitudinal axis of the bearing cap;
      a second recess extending from an exterior second surface of the bearing cap into the bearing cap in the direction of the longitudinal axis, the second surface opposite the first surface; and
      a thrust surface extending over the first and second recesses and the thrust surface bending along an axial profile to form a more convex curvature in the direction of the longitudinal axis upon bolting the bearing cap to the cylinder block due to the first and second recesses.

2. The engine block assembly of claim 1, wherein tops of the first and second recesses are positioned a constant distance from the thrust surface and wherein the constant distance is approximately 5.0 mm.

3. The engine block assembly of claim 1, wherein the first and second recesses cause a rigidity of the thrust surface along the axial profile to vary, thereby inducing the thrust surface to bend to the more convex curvature when bolting the bearing cap to the cylinder block and the thrust surface to extend outward toward the crankshaft bearing near a central axis of the of the bearing cap.

4. The engine block assembly of claim 3, wherein the rigidity of the thrust surface is greater more proximate the central axis of the bearing cap and less near edges of the bearing cap.

5. The engine block assembly of claim 1, wherein the first and second recesses extend inwards from the exterior first and second surfaces respectively, forming recessed walls within the bearing cap, wherein the recessed walls are separated by a distance of approximately 6.0 mm.

6. The engine block assembly of claim 1, wherein a first compressive force of approximately 20 kN is applied to the cylinder block and the bearing cap when bolting the bearing cap to the cylinder block, and wherein the thrust surface bends at compressive forces greater than a second compressive force, the second compressive force less than the first compressive force.

7. The engine block assembly of claim 6, further comprising two or more main bearing bolts for fastening the bearing cap to the cylinder block, where the main bearing bolts extend through the bearing cap and into the cylinder block, and wherein the first compressive force is applied by tightening the main bearing bolts to a fully tightened position.

8. The engine block assembly of claim 1, wherein the thrust surface exerts a compressive force on the crankshaft bearing when bolting the bearing cap to the cylinder block, and where the compressive force is greater nearer a central axis of the crankshaft bearing.

9. A crankshaft main bearing cap comprising:
   a first recess extending from included on a front surface of the bearing cap into the bearing cap in a direction of a longitudinal axis of the bearing cap;
   a second recess extending from a back surface of the bearing cap into the bearing cap in the direction of the longitudinal axis of the bearing cap, the back surface opposite the front surface, wherein the recesses are not filled with any solid material, such that only air exists within the recesses;
   a semicircular thrust surface for retaining a crankshaft, where a flexibility of the thrust surface varies along an axial profile of the thrust surface; and
   a thrust bearing adapted to interface with the thrust surface and a main journal of the crankshaft, and the thrust bearing deforming to increase a convexity of the thrust bearing along an axial profile of the thrust bearing to a final curvature when bolting the bearing cap to a cylinder block, the axial profile of the thrust bearing extending over the first and second recesses in the direction of the longitudinal axis.

10. The crankshaft main bearing cap of claim 9, wherein the thrust surface is flat along the axial profile of the thrust surface prior to bolting the bearing cap to the cylinder block, and where the thrust surface bends to a convex curvature along the axial profile of the thrust surface when bolting the bearing cap to the cylinder block due to a structural stability of the thrust surface being less at edges of the thrust surface than at a central axis of the thrust surface, the reduced structural stability resulting from the first and second recesses.

11. The crankshaft main bearing cap of claim 10, wherein the convex curvature is defined by a bend angle of approximately 0.025 degrees.

12. The crankshaft main bearing cap of claim 9, wherein a compressive force exerted on the thrust bearing by the thrust surface is greater nearer a central axis of the thrust bearing.

13. The crankshaft main bearing cap of claim 9, wherein the final curvature of the thrust bearing is defined by a bend angle of approximately 0.025 degrees.

14. The crankshaft main bearing cap of claim 9, wherein when bolting the bearing cap to the cylinder block, the thrust surface exerts a compressive force on the thrust bearing, and the thrust bearing exerts a normal force on the thrust surface, the normal force approximately equal in magnitude and opposite in direction to the compressive force.

15. The crankshaft main bearing cap of claim 9, wherein the first recess extends inwards from the front surface towards a central axis of the bearing cap, defining a depth of the first recess, where the depth of the first recess is approximately 8 mm.

16. The crankshaft main bearing cap of claim 9, wherein the second recess extends inwards from the back surface towards a central axis of the bearing cap, defining a depth of the second recess, where the depth of the second recess is approximately 8 mm.

17. An engine block assembly comprising:
a cylinder block;
a crankshaft;
a bearing cap bolted to the cylinder block, the bearing cap comprising:
- a first recess extending inwards from a front first surface of the bearing cap along a longitudinal axis of the bearing cap;
- a second recess extending inwards from a second surface of the bearing cap along the longitudinal axis of the bearing cap, the second recess opposite the first surface, wherein the first and second surfaces define exterior surfaces of the bearing cap such that only air occupies the first and second recesses; and
- a thrust surface extending of the first and second recesses, where a mechanical strength of the thrust surface is greater nearer a central axis of the thrust surface, such that the thrust surface bends a greater amount near the central axis to form a more convex curvature along an axial profile in a direction of the longitudinal axis upon bolting the bearing cap to the cylinder block; and a crankshaft bearing positioned between the crankshaft and the bearing cap, and where a first surface of the crankshaft bearing interfaces with the thrust surface, and where an opposite second surface of the crankshaft bearing interfaces with a main journal of the crankshaft.

18. The engine block assembly of claim 17, wherein a depth of the first recess is approximately a third of a length of the bearing cap.

19. The engine block assembly of claim 17, where a depth of the second recess is approximately a third of a length of the bearing cap.

20. The engine block assembly of claim 17, wherein the thrust surface exerts a greater compressive force on the crankshaft bearing nearer the central axis of the crankshaft bearing when the bearing cap is bolted to the cylinder block.

* * * * *